(12) United States Patent
Lin et al.

(10) Patent No.: US 9,843,820 B2
(45) Date of Patent: Dec. 12, 2017

(54) METHOD AND APPARATUS OF UNIFIED DISPARITY VECTOR DERIVATION FOR 3D VIDEO CODING

(71) Applicant: MEDIATEK INC., Hsin-Chu (TW)

(72) Inventors: Jian-Liang Lin, Yilan County (TW); Yi-Wen Chen, Taichung (TW); Yu-Wen Huang, Taipei (TW); Shaw-Min Lei, Hsinchu County (TW)

(73) Assignee: MEDIATEK INC, Hsinchu (TW)

( * ) Notice: Subject to any disclaimer, the term of this patent is extended or adjusted under 35 U.S.C. 154(b) by 0 days.

(21) Appl. No.: 14/412,203

(22) PCT Filed: Jul. 5, 2013

(86) PCT No.: PCT/CN2013/078881
§ 371 (c)(1),
(2) Date: Dec. 30, 2014

(87) PCT Pub. No.: WO2014/005548
PCT Pub. Date: Jan. 9, 2014

(65) Prior Publication Data
US 2015/0201216 A1    Jul. 16, 2015

Related U.S. Application Data

(60) Provisional application No. 61/668,424, filed on Jul. 5, 2012, provisional application No. 61/744,888, filed on Oct. 3, 2012.

(51) Int. Cl.
*H04N 19/597* (2014.01)
*H04N 19/105* (2014.01)
(Continued)

(52) U.S. Cl.
CPC ......... *H04N 19/597* (2014.11); *H04N 19/105* (2014.11); *H04N 19/139* (2014.11); *H04N 19/176* (2014.11); *H04N 19/513* (2014.11)

(58) Field of Classification Search
CPC .................................................. H04N 19/597
(Continued)

(56) References Cited

U.S. PATENT DOCUMENTS 8,320,456 B2 * 11/2012 Koo .................... H04N 19/597
375/240.13
8,532,410 B2   9/2013 Tian et al.
(Continued)

FOREIGN PATENT DOCUMENTS

CN     101056398 A     10/2007
CN     101453662 A     6/2009
(Continued)

OTHER PUBLICATIONS

NPL—MVC inter-view skip mode with Depth information; Gang Zhu, 2010.*
(Continued)

*Primary Examiner* — Luis Perez Fuentes
(74) *Attorney, Agent, or Firm* — McClure, Qualey & Rodack, LLP (57) ABSTRACT

A method and apparatus for three-dimensional video coding or multi-view video coding are disclosed. Embodiments according to the present invention derive a unified disparity vector from depth information for Inter mode and Skip/Direct mode. The unified disparity vector is derived from a subset of depth samples in an associated depth block corresponding to the current block using a unified derivation method. The unified derivation method is applied in Inter mode, Skip mode, or Direct mode when a disparity vector derived from depth data is required for encoding or decoding. The unified disparity vector can also be applied to derive a disparity vector for locating a corresponding block, and thus an inter-view motion vector candidate can be determined for Skip mode or Direct mode.

8 Claims, 6 Drawing Sheets

(51) Int. Cl.
*H04N 19/139* (2014.01)
*H04N 19/176* (2014.01)
*H04N 19/513* (2014.01)

(58) Field of Classification Search
USPC .......................................................... 375/240
See application file for complete search history.

(56) References Cited

U.S. PATENT DOCUMENTS

| | | | | |
|---|---|---|---|---|
| 8,619,082 | B1* | 12/2013 | Ciurea | G06T 7/593 345/427 |
| 8,687,050 | B2 | 4/2014 | Baker | H04N 13/0425 348/51 |
| 8,823,821 | B2* | 9/2014 | Tian | H04N 7/181 348/218.1 |
| 9,113,196 | B2* | 8/2015 | Sung | H04N 21/235 |
| 9,237,345 | B2* | 1/2016 | Kang | H04N 19/597 |
| 9,253,486 | B2* | 2/2016 | Tian | H04N 19/00569 |
| 9,258,562 | B2* | 2/2016 | Zhang | H04N 19/597 |
| 9,264,691 | B2* | 2/2016 | Zou | H04N 19/597 |
| 9,349,192 | B2* | 5/2016 | Koo | H04N 19/597 |
| 9,503,702 | B2* | 11/2016 | Geil | H04N 13/0048 |
| 9,667,996 | B2* | 5/2017 | Chen | H04N 19/597 |
| 2007/0291850 | A1 | 12/2007 | Ishikawa et al. | |
| 2011/0044550 | A1 | 2/2011 | Tian et al. | |

FOREIGN PATENT DOCUMENTS

| | | |
|---|---|---|
| CN | 101483770 A | 7/2009 |
| CN | 102017627 A | 4/2011 |
| JP | 2010502945 | 1/2010 |
| JP | 2012100019 | 5/2012 |
| WO | WO 2008/029345 | 3/2008 |
| WO | WO 2013/053309 | 4/2013 |

OTHER PUBLICATIONS

Mitsubishi response to MPEG call for proposal on 3D Video coding technology ; Tian; Nov. 2011.*

3DV v.3.0—HEVC consideration based on 3D video coding—Test Model; Schwaez; 2012.*

SPIE NPL search log.*

Schwarz, H., et al.; "3D-HEVC-CE3 results on inter-view motion parameter prediction by HHI;" International Organisation for Standardisation; ISO/IEC JTC1/SC29/WG11 Coding of Moving Pictures and Audio; Feb. 2012; pp. 1-10.

Lee, C., et al.; "A Frameword of 3D Video Coding using View Synthesis Prediction;" 2012 Picture Coding Symposium; May 2012; pp. 2-5.

Rusanovkyy, D., et al.; "Suggestion for a depth-enhanced multiview video coding extension to H.264 Annex A: Nokia 3DV Test Model (3DV-TM) Codec Description and Simulation Results;" ITU-Telecommunications Standardization Sector; Feb. 2012; pp. 2-15.

Lin, J.L., et al.; "3D-CE5. H related Simplification on disparity vector derivation for HEVC-based 3D video coding;" Joint Collaborative Team on 3D Video Coding Extension Development of ITU-T SG16 WP3 and ISO/IEC JTC 1/SC 29/WG 11; Jul. 2012; pp. 2-4.

* cited by examiner

METHOD AND APPARATUS OF UNIFIED DISPARITY VECTOR DERIVATION FOR 3D VIDEO CODING

CROSS REFERENCE TO RELATED APPLICATIONS

The present invention claims priority to U.S. Provisional Patent Application Ser. No. 61/668,424, filed on Jul. 5, 2012, entitled "Disparity vector derivation for inter-view predictor in ATM", and U.S. Provisional Patent Application Ser. No. 61/744,888, filed on Oct. 3, 2012, entitled "Disparity vector derivation for video coding". The U.S. Provisional patent applications are hereby incorporated by reference in their entireties.

TECHNICAL FIELD

The present invention relates to video coding. In particular, the present invention relates to disparity vector derivation based on depth data for 3D video coding.

BACKGROUND

Three-dimensional (3D) television has been a technology trend in recent years that is targeted to bring viewers sensational viewing experience. Multi-view video is a technique to capture and render 3D video. The multi-view video is typically created by capturing a scene using multiple cameras simultaneously, where the multiple cameras are properly located so that each camera captures the scene from one viewpoint. The multi-view video with a large number of video sequences associated with the views represents a massive amount data. Accordingly, the multi-view video will require a large storage space to store and/or a high bandwidth to transmit. Therefore, multi-view video coding techniques have been developed in the field to reduce the required storage space and the transmission bandwidth. A straightforward approach may simply apply conventional video coding techniques to each single-view video sequence independently and disregard any correlation among different views. Such straightforward techniques would result in poor coding performance. In order to improve multi-view video coding efficiency, multi-view video coding always exploits inter-view redundancy. The disparity between two views is caused by the locations and angles of the two respective cameras. The disparity model, such as an affine model, is used to indicate the displacement of an object in two view frames. Furthermore, motion vector for frames in one view can be derived from the motion vector for respective frames in another view.

For 3D video, besides the conventional texture data associated with multiple views, depth data is often captured or derived as well. The depth data may be captured for video associated with one view or multiple views. The depth information may also be derived from images of different views. The depth data may be represented in lower spatial resolution than the texture data. The depth information is useful for view synthesis and inter-view prediction. To share the previously encoded texture information of reference views, the concept of disparity-compensated prediction (DCP) has been added as an alternative to the motion-compensated prediction (MCP). MCP refers to an Inter picture prediction that uses previously coded pictures of the same view in a different access unit, while DCP refers to an Inter picture prediction that uses already coded pictures of other views in the same access unit. The vector used for DCP is termed disparity vector (DV), which is analog to the motion vector (MV) used in MCP.

Figure 1A:
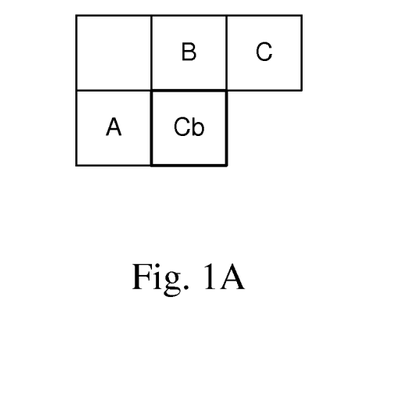
FIG. 1A illustrates an example of neighboring blocks used to derive motion vector predictors for a current block.

The depth-based motion vector prediction method in 3DV-ATM version 2 (Test Model for AVC based 3D Video Coding) consists of two major tools. The first tool is direction-separated motion vector prediction for Inter mode and the second tool is depth-based motion vector competition for Skip and Direct modes. The motion vector for a current block can be predicted based on motion vector prediction and the candidate motion vectors associated with neighboring blocks are used for motion vector prediction. FIG. 1A illustrates an example of MVP (motion vector predictor) derivation based on neighboring blocks, where block Cb corresponds to a current block and blocks A, B and C correspond to three spatially neighboring blocks. If the target reference picture is a temporal prediction picture, the motion vectors of the spatially neighboring blocks (i.e., blocks A, B, and C) are provided and the motion vectors are derived based on the texture data of respective blocks. If a temporal motion vector for the neighboring block is unavailable, a zero vector is used as the MV (motion vector) candidate. The temporal motion vector prediction is then derived based on the median of the motion vectors of the adjacent blocks A, B, and C.

Figure 1B:
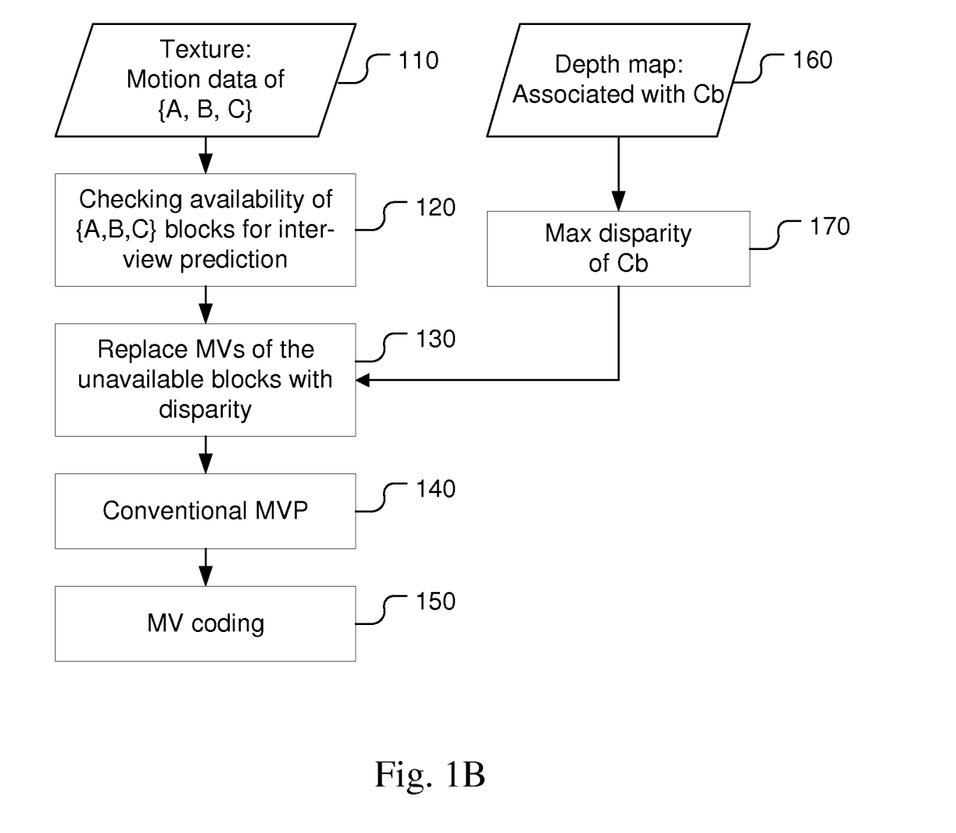
FIG. 1B illustrates an example of direction-separated motion vector prediction for the Inter mode, where an unavailable inter-view motion vector is replaced by a disparity vector and the disparity vector is determined based on all depth samples of the current block.

On the other hand, if the target reference picture is an inter-view prediction picture, the inter-view motion vectors of the neighboring blocks are used to derive the inter-view motion vector predictor. In block 110 of FIG. 1B, inter-view motion vectors of the spatially neighboring blocks are derived based on the texture data of respective blocks. The depth map associated with the current block Cb is also provided in block 160. The availability of inter-view motion vector for blocks A, B and C is checked in block 120. If an inter-view motion vector is unavailable, the disparity vector for the current block is used to replace the unavailable inter-view motion vector as shown in block 130. The disparity vector is derived from the maximum depth value of the associated depth block as shown in block 170. The median of the inter-view motion vectors of blocks A, B and C is used as the inter-view motion vector predictor. The conventional MVP procedure, where a final MVP is derived based on the median of the motion vectors of the inter-view MVPs or temporal MVPs as shown in block 140. Motion vector coding based on the motion vector predictor is performed as shown in block 150.

Figure 2A:
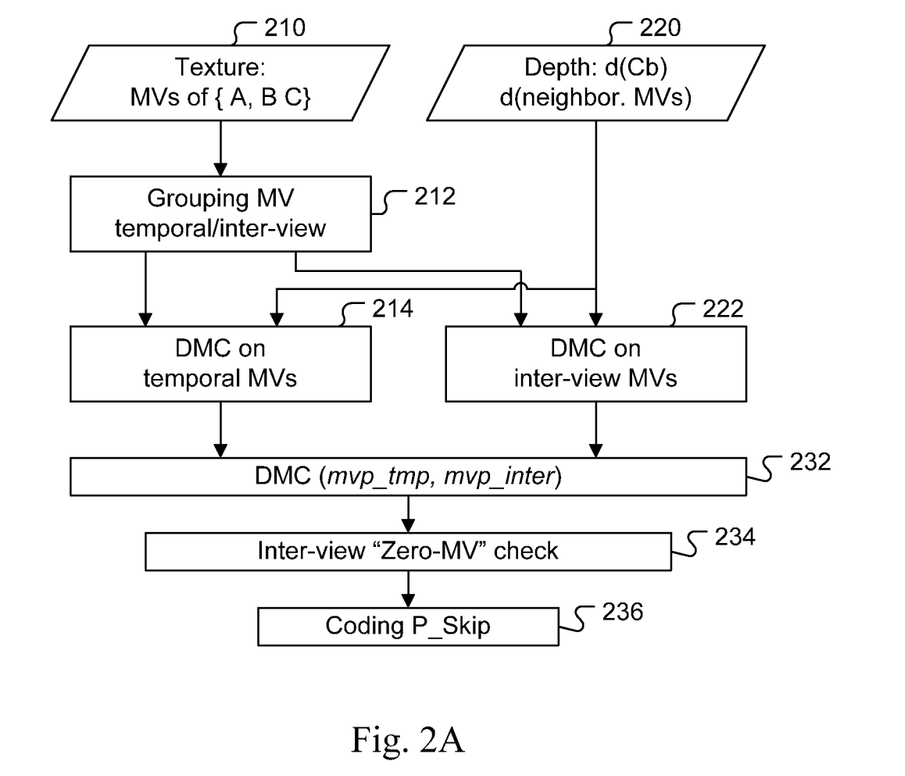
FIG. 2A illustrates an exemplary flowchart of the derivation process for Depth-based Motion Competition (DMC) in Skip mode.
Figure 2B:
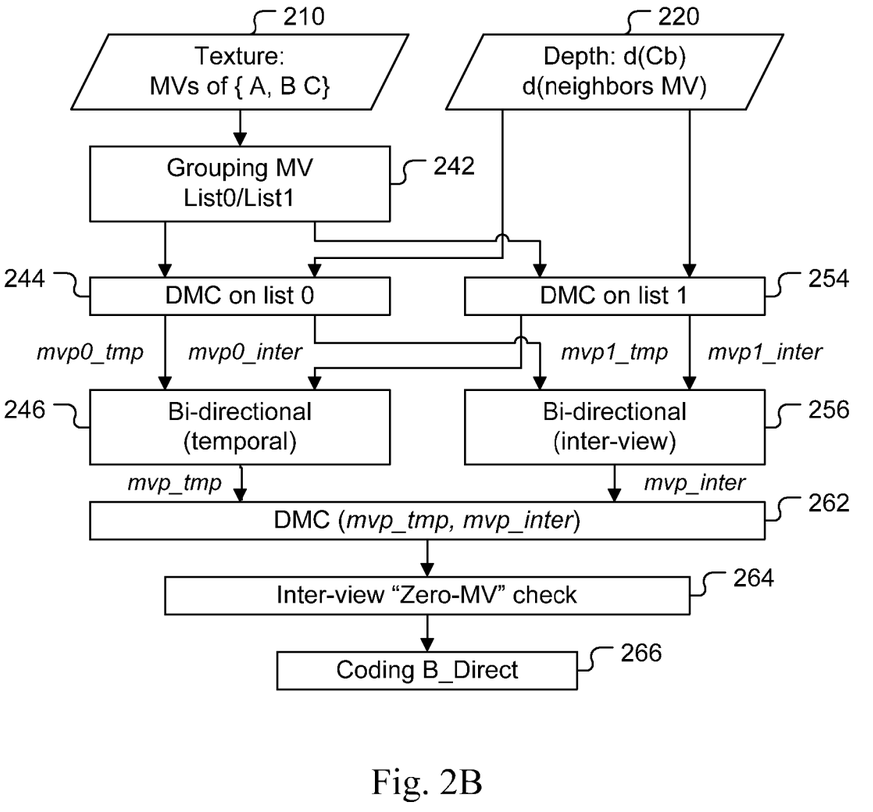
FIG. 2B illustrates an exemplary flowchart of the derivation process for the Depth-based Motion Competition (DMC) in Direct mode.

Flowcharts of the process for the Depth-based Motion Competition (DMC) in the Skip and Direct modes according to 3DV-ATM version 2 are shown in FIG. 2A and FIG. 2B respectively. The inputs to the process include motion data 210 associated with blocks A, B and C, and depth map 220 associated with block Cb and blocks A, B and C. The block configuration of Cb, A, B and C are shown in FIG. 1A. In the Skip mode, motion vectors {$mv_i$} of texture data blocks {A, B, C} are separated into respective temporal and inter-view groups (step 212) according to their prediction directions. The DMC is performed separately for temporal MVs (step 214) and inter-view MVs (step 222).

For each motion vector $mv_i$ within a given group (temporal or inter-view), a motion-compensated depth block $d(cb,mv_i)$ is derived, where the motion vector $mv_i$ is applied to the position of $d(cb)$ to obtain the depth block from the reference depth map pointed to by the motion vector $mv_i$. The similarity between $d(cb)$ and $d(cb,mv_i)$ is then estimated according to equation (2):

$$SAD(mv_i)=SAD(d(cb,mv_i),d(cb)). \qquad (2)$$

The $mv_i$ that achieves the minimum sum of absolute differences (SAD) within a given group is selected as the optimal predictor for the group in a particular direction ($mvp_{dir}$), i.e.

$$mvp_{dir} \arg\min_{mvp_{dir}} (SAD(mv_i)). \quad (3)$$

The predictor in the temporal direction (i.e., $mvp_{tmp}$) competes against the predictor in the inter-view direction (i.e., $mvp_{inter}$). The predictor that achieves the minimum SAD can be determined according to equation (4) for the Skip mode (step 232):

$$mvp_{opt} = \arg\min_{mvp_{dir}} (SAD(mvp_{tmp}), SAD(mvp_{inter})). \quad (4)$$

Finally, if the optimal MVP $mvp_{opt}$ refers to another view (inter-view prediction), the following check is applied to the optimal MVP. In the case that the optimal MVP corresponds to "Zero-MV", the optimal MVP is replaced by the "disparity-MV" predictor (step 234) and the derivation of the "disparity-MV" predictor is shown in equation (1). The final MVP is used for Skip mode as shown in step 236.

$$\overline{D}(cb) = (1/N)\Sigma_i D(cb(i)) \quad (1)$$

where i is index of pixels within current Cb, N is a total number of pixels in Cb.

The flowchart of MVP derivation for the Direct mode of B slices is illustrated in FIG. 2B, which is similar to that for the Skip mode. However, DMC is performed over both reference pictures lists (i.e., List 0 and List 1) separately (step 242). Therefore, for each prediction direction (temporal or inter-view), DMC produces two predictors ($mvp0_{dir}$ and $mvp1_{dir}$) for List 0 and List 1 respectively (step 244 and step 254). The bi-direction compensated blocks (steps 246 and step 256) associated with $mvp0_{dir}$ and $mvp1_{dir}$ are computed according to equation (5):

$$d(cb, mvp_{dir}) = \frac{d(cb, mvp0_{dir}) + d(cb, mvp1_{dir})}{2}. \quad (5)$$

The SAD value between this bi-direction compensated block and Cb is calculated according to equation (2) for each direction separately. The MVP for the Direct mode is then selected from available $mvp_{inter}$ and $mvp_{tmp}$ (step 262) according to equation (4). If the optimal MVP $mvp_{opt}$ refers to another view (i.e., MVP corresponding to inter-view prediction), the following check is applied to the optimal MVP. If the optimal MVP corresponds to "Zero-MV", the "zero-MV" in each reference list is replaced by the "disparity-MV" predictor (step 264) and the derivation of the "disparity-MV" predictor is shown in (1). The final MVP is used for the Direct mode as shown in step 266.

As shown above, the disparity vector derivation from depth information is quite complicated for the Skip and Direct modes according to 3DV-ATM version 2. Furthermore, the disparity vector derivation from depth information is different between Inter mode and Skip/Direct mode. It is desirable to simplify the derivation process without noticeable impact on the performance.

SUMMARY

A method and apparatus for three-dimensional video coding or multi-view video coding are disclosed. Embodiments according to the present invention derive a unified disparity vector from depth information using a unified derivation method for Inter mode and Skip/Direct mode. Input data of a current block is encoded or decoded according to the unified disparity vector. The unified derivation method generates the unified disparity vector from a subset of depth samples in an associated depth block, and the unified derivation method is applied in the Inter mode, Skip mode, or Direct mode when a disparity vector derived from depth data is required for encoding or decoding. The subset contains less depth samples than the associated depth block. In some embodiments, one or more inter-view motion vector (MV) or disparity vector (DV) predictors are derived based on a neighboring block set of the current block, wherein one inter-view MV or DV predictor associated with one block in the neighboring block set is generated from the unified disparity vector if said one block in the neighboring block set does not have one MV or DV. If Inter mode is selected for the current block, encoding or decoding is applied to the MV/DV or coded MV/DV of the current block using said one or more inter-view MV or DV predictors. In one embodiment, if Skip mode or Direct mode is selected for the current block, encoding or decoding is applied to the input data using an inter-view MV candidate generated from a corresponding block located by a DV derived from one or more DV predictor. The one or more DV predictors are determined based on a neighboring block set of the current block, wherein one DV predictor associated with one block in the neighboring block set is generated from the unified disparity vector if said one block in the neighboring block set does not have any DV. The unified disparity vector can be used for locating a corresponding block in an inter-view picture for disparity compensated prediction (DCP), direction-separated motion vector prediction, inter-view motion prediction, or inter-view residual prediction. An aspect of the present invention addresses the unified derivation method for disparity vector derivation from depth information. The unified disparity vector can be generated from a subset of depth values associated with the current block, wherein the subset contains less depth samples than the associated depth block. In some embodiments, the subset comprises one or more boundary samples, for examples, a middle sample or two corner samples in a bottom row of the associated depth block, four corner samples. In an embodiment, the subset further comprises a center sample of the associated depth block. The unified disparity vector may correspond to a maximum value, an average value, a median value, a most frequent occurrence, or a linear combination of depth values of a subset of the associated depth block, wherein the subset contains two or more depth samples. In one embodiment, the unified disparity vector is generated from four corner samples of the associated depth block. Furthermore, the unified disparity vector can be generated from the maximum depth values of four corner samples of the associated depth block. The neighboring block set may consist of blocks A, B and C, corresponding to a first location at left-top side of the current block, a second location at top-left side of the current block and a third location diagonally across from an upper-right corner of the current block respectively. The inter-view motion vector or disparity vector candidate can be determined from the neighboring block set of the current block according to a search order in the Skip/Direct mode.

A flag can be used to indicate whether the unified derivation method is shared by the Inter mode, the Skip mode and the Direct mode.

DETAILED DESCRIPTION

As mentioned before, the direction-separate motion vector prediction consists of the temporal and inter-view motion vector prediction. If the target reference picture is a temporal prediction picture, the temporal motion vectors of the adjacent blocks around the current block Cb such as A, B, and C in FIG. 1 are employed in the derivation of the motion vector prediction. If a temporal motion vector is unavailable, a zero vector is used. The motion vector prediction is then derived as the median of the motion vectors of the adjacent blocks A, B, and C.

Figure 3:
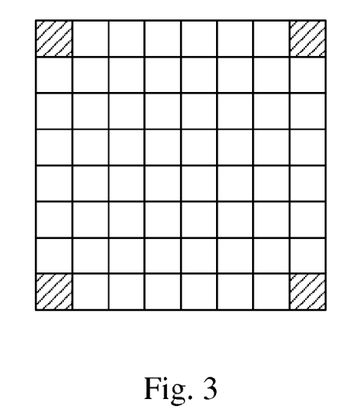
FIG. 3 illustrates an example of disparity vector derivation based on four corner depth values of an associated depth block.

If the target reference picture is an inter-view prediction picture, the inter-view motion vectors of the neighboring blocks are employed for the inter-view prediction. If an inter-view motion vector is unavailable, a disparity vector is derived from the maximum depth value of depth samples within the associated depth block according to 3DV-ATM version 2. In order to simplify the disparity vector derivation process, an embodiment according to the present invention derives the disparity vector based on depth values at four corner samples of the associated depth block as shown in FIG. 3. The motion vector predictor is then derived as the median of the inter-view motion vector or the disparity vector if the inter-view motion vector is unavailable of the adjacent blocks A, B, and C. The disparity vector predictor can be derived using the same derivation process as the motion vector predictor according to the present invention.

Figure 4:
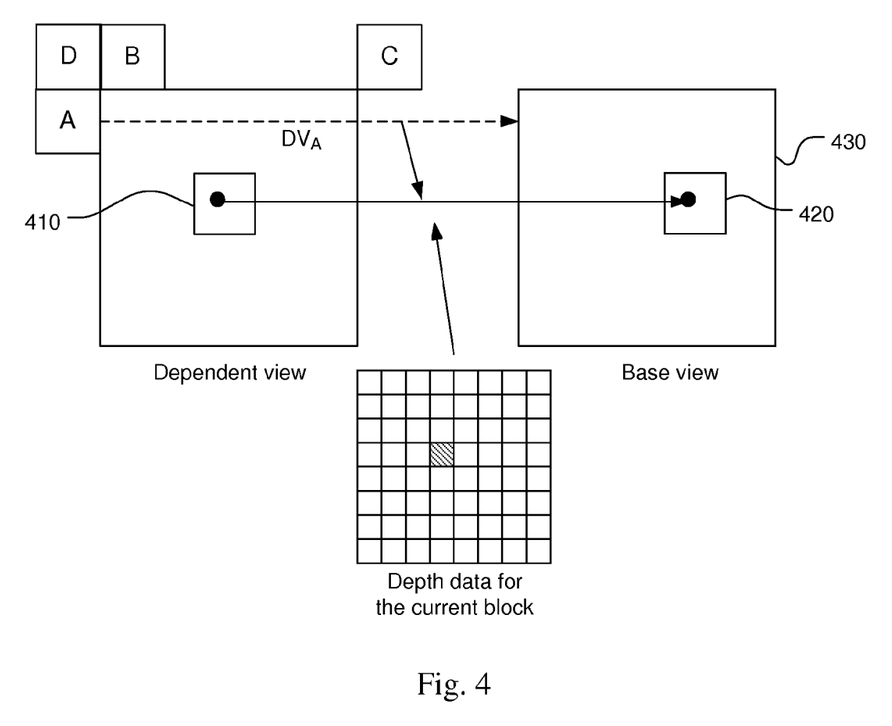
FIG. 4 illustrates an example of priority-based MVP candidate derivation for Skip/Direct mode in 3DV-ATM version 5.

In Skip/Direct mode, an MVP candidate is derived based on a predefined derivation order. The inter-view candidate and the three spatial candidates associated with the neighboring blocks A, B, and C (D is used only when C is unavailable) are included for deriving the inter-view motion vector (MV) or motion vector prediction (MVP) candidate according to 3DV-ATM version 5 as shown in FIG. 4. On the decoder side, the motion compensation is performed according to the motion information of the derived MVP candidate. The motion information includes the prediction direction (uni-direction prediction or bi-direction prediction), the reference picture type (temporal prediction, virtual prediction, or inter-view prediction), and the reference picture index in addition to the motion vector.

Inter-view MV or MVP candidate derivation is also shown in FIG. 4. The central point of the current block 410 in the dependent view and its disparity vector are used to find the corresponding point in the base view. After that the corresponding point is identified, the MV of the block 420 covering the corresponding point in the base view is used as the inter-view MV or MVP candidate of the current block. The disparity vector can be derived from the neighboring blocks or the depth value of the central point. If one of the neighboring blocks has disparity vector (DV), e.g. $DV_A$ of neighboring block A in FIG. 4, the DV of the neighboring block is used as the disparity to locate the corresponding point. Otherwise, the depth-based disparity vector is used to locate the corresponding point, where the depth-based disparity vector is derived using the depth value of the central point and camera parameters. The neighboring blocks in FIG. 4 consists of blocks A, B and C, corresponding to a first location at left-top side of the current block, a second location at top-left side of the current block and a third location diagonally across from an upper-right corner of the current block respectively. Block D corresponds to a fourth location diagonally across from an upper-left corner of the current block, and block D is used to replace block C if block C does not have a disparity vector.

In 3DV-ATM version 2, the depth-based disparity vector derivation for Inter mode is based on the maximum depth value of the current block. For a large block, the derivation of the maximum value of the current block may involve a large amount of computations. An embodiment of the present invention determines the maximum depth value among depth values at 4 corner samples of the current block, which substantially reduces the required computations. On the other hand, the depth-based disparity vector derivation for Skip/Direct mode in 3DV-ATM version 5 is based on the depth value of the central position of the current block. The depth-based disparity vector derivation for Skip/Direct mode in 3DV-ATM version 2 as described before is fairly complicated. Therefore, the depth-based disparity vector derivation is different between the Inter mode and the Skip/Direct mode.

Figure 5A:
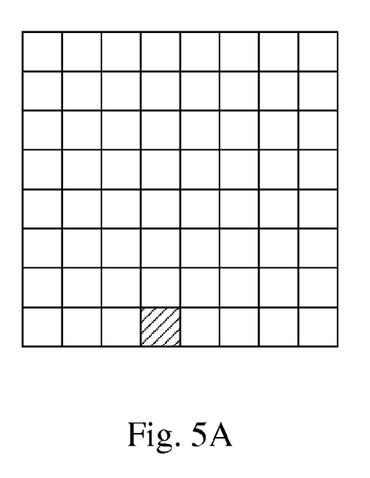
FIG. 5A-FIG. 5C illustrate examples of depth samples used for disparity vector derivation from depth information.
Figure 5B:
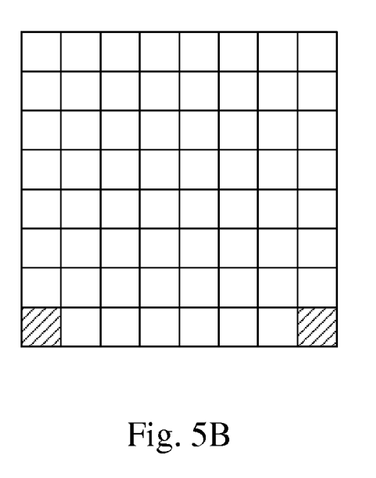
Figure 5C:
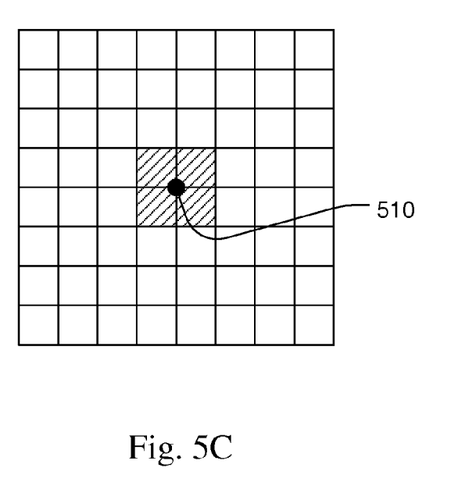

In order to simplify the depth-based disparity vector derivation, embodiments of the present invention use a unified derivation method to generate a unified disparity vector for both Inter mode and the Skip/Direct mode. The unified derivation method is applied to both the Inter mode and the Skip/Direct mode when a disparity vector derived from depth data is required. For example, the disparity vector derivation for both the Inter mode and the Skip/Direct mode can be based on the depth values at four corner samples of the current block as shown in FIG. 3. In another example, the disparity vector derivation for both the Inter mode and the Skip/Direct mode can be based on the middle depth value at bottom row of the current block as shown in FIG. 5A. In yet another example, the disparity vector derivation for both the Inter mode and the Skip/Direct mode can be based on the depth value at two ends of the bottom row of the current block as shown in FIG. 5B. Any other subset of the depth having less depth samples than the associated depth block may also be used by both the Inter mode and the Skip/Direct mode to reduce the complexity of DV derivation method. In some examples, one or more boundary depth value associated with the current block is used for disparity vector derivation. In another example, a center depth value can be used to derive disparity vector. The center depth value may corresponds to an upper-left sample, an upper-right sample, a lower-left sample or a lower-right sample to the center point (indicated by 510 in FIG. 5C) of the current block. In yet another example, the depth values for a central position and four corner positions can be used.

In addition to the maximum value, the derived disparity vector may correspond to the average value, the median value, the most frequent occurrence, or a linear combination of depth values of the associated depth block or a subset of the associated depth block, where the subset contains two or more depth samples. For example, the derived disparity vector corresponds to the maximum value of four corner samples of the associated depth block and the derived disparity vector is shared by Inter mode, Skip/Direct mode. The use of unified disparity vector derivation can also be applied to inter-view disparity vector (DV) or disparity vector prediction (DVP) candidate for Skip/Direct mode according to the present invention.

The derived disparity vector can be used to derive an inter-view motion vector or disparity vector predictor in adaptive motion vector prediction (AMVP)/Inter mode, an inter-view candidate in Merge mode or Skip mode, inter-view motion prediction, inter-view disparity prediction, or inter-view residual prediction to locate a reference residual block. The derived disparity vector points to an inter-view reference picture when the derived disparity vector is used as the inter-view motion vector predictor in AMVP/Inter mode. The derived disparity vector can be used to locate a reference block for inter-view motion vector or disparity vector prediction in AMVP/Inter mode. The derived disparity vector can be used to derive an inter-view motion vector or disparity candidate for a block coded in Skip mode or Direct mode, where neither residual signal nor motion information is transmitted in the Skip mode and no motion information is transmitted in the Direct mode. The derived disparity vector can be used as direction-separated motion vector predictor in Inter mode. The derived disparity vector can be used in priority based MVP candidate derivation for Skip/Direct mode to locate corresponding point in the reference view.

The unified disparity vector derivation method for Inter mode and Skip/Direct mode is compared to an anchor system based on 3DV-ATM version 5.1. The number of the depth samples to be accessed is 4 (i.e., the depth values at 4 corner samples associated with the current block) for both Inter mode and Skip/Direct mode according to an embodiment of the present invention. On the other hand, the number of depth samples is 4 (i.e., the depth values at 4 corner samples of the current block) for the Inter mode and the number of depth samples is 1 (i.e., the central depth value associated with the current block) for the Skip/Direct mode in 3DV-ATM version 5.1. Performance comparisons are shown in Table 1, where a system based on 3DV-ATM v.5.1 is used as a reference. The value, "dBR" corresponds to the difference in bitrate expressed in percentage (%), where a negative value means reduced bitrate compared to the reference system. The value, "dPSNR" corresponds to the difference in peak signal-to-noise ratio (PSNR) expressed in decibel (dB), where a positive value means improved PSNR. The comparisons are based on different test video sets (S01-S08). As shown in Table 1, the method according to the present invention achieves about the same PSNR at slightly lower average bitrates for texture coding, texture and depth coding and synthesized video.

TABLE 1

| | Texture Coding | | Total (Coded PSNR) | | Total (Synthesized PSNR) | |
| --- | --- | --- | --- | --- | --- | --- |
| | dBR, % | dPSNR, dB | dBR, % | dPSNR, dB | dBR, % | dPSNR, dB |
| S01 | −0.17 | 0.00 | −0.15 | 0.00 | −0.15 | 0.00 |
| S02 | −0.11 | 0.00 | −0.10 | 0.00 | −0.10 | 0.00 |
| S03 | −0.31 | 0.01 | −0.29 | 0.01 | −0.29 | 0.01 |
| S04 | −0.11 | 0.00 | −0.10 | 0.00 | −0.10 | 0.00 |
| S05 | −0.39 | 0.02 | −0.32 | 0.01 | −0.33 | 0.01 |
| S06 | −0.27 | 0.01 | −0.24 | 0.01 | −0.25 | 0.01 |
| S08 | −0.09 | 0.00 | −0.07 | 0.00 | −0.05 | 0.00 |
| Average | −0.21 | 0.01 | −0.18 | 0.01 | −0.18 | 0.01 |

Another comparison is performed, where the unified disparity derivation method is based on one depth sample (i.e., the central depth value of the current block) for both the Inter mode and the Skip/Direct mode. On the other hand, the anchor system is based on 3DV-ATM version 5.1 as before. The results are shown in Table 2. As shown in Table 2, the method according to the present invention achieves the same PSNR at slightly higher average bitrates for texture coding, texture and depth coding and synthesized video.

TABLE 2

| | Texture Coding | | Total (Coded PSNR) | | Total (Synthesized PSNR) | |
| --- | --- | --- | --- | --- | --- | --- |
| | dBR, % | dPSNR, dB | dBR, % | dPSNR, dB | dBR, % | dPSNR, dB |
| S01 | 0.01 | 0.00 | 0.01 | 0.00 | 0.03 | 0.00 |
| S02 | 0.16 | 0.00 | 0.15 | 0.00 | 0.08 | 0.00 |
| S03 | 0.11 | 0.00 | 0.10 | 0.00 | 0.09 | 0.00 |
| S04 | 0.12 | 0.00 | 0.12 | 0.00 | 0.06 | 0.00 |
| S05 | 0.05 | 0.00 | 0.05 | 0.00 | 0.02 | 0.00 |
| S06 | 0.05 | 0.00 | 0.04 | 0.00 | 0.04 | 0.00 |
| S08 | 0.06 | 0.00 | 0.06 | 0.00 | 0.05 | 0.00 |
| Average | 0.08 | 0.00 | 0.07 | 0.00 | 0.05 | 0.00 |

A flag can be used to indicate whether a unified derivation method for deriving disparity vector from depth information is shared by Inter mode and Skip/Direct mode. The flag can be incorporated in the sequence level, picture, slice level, largest coding unit (LCU) level or coding level of the bitstream.

Figure 6:
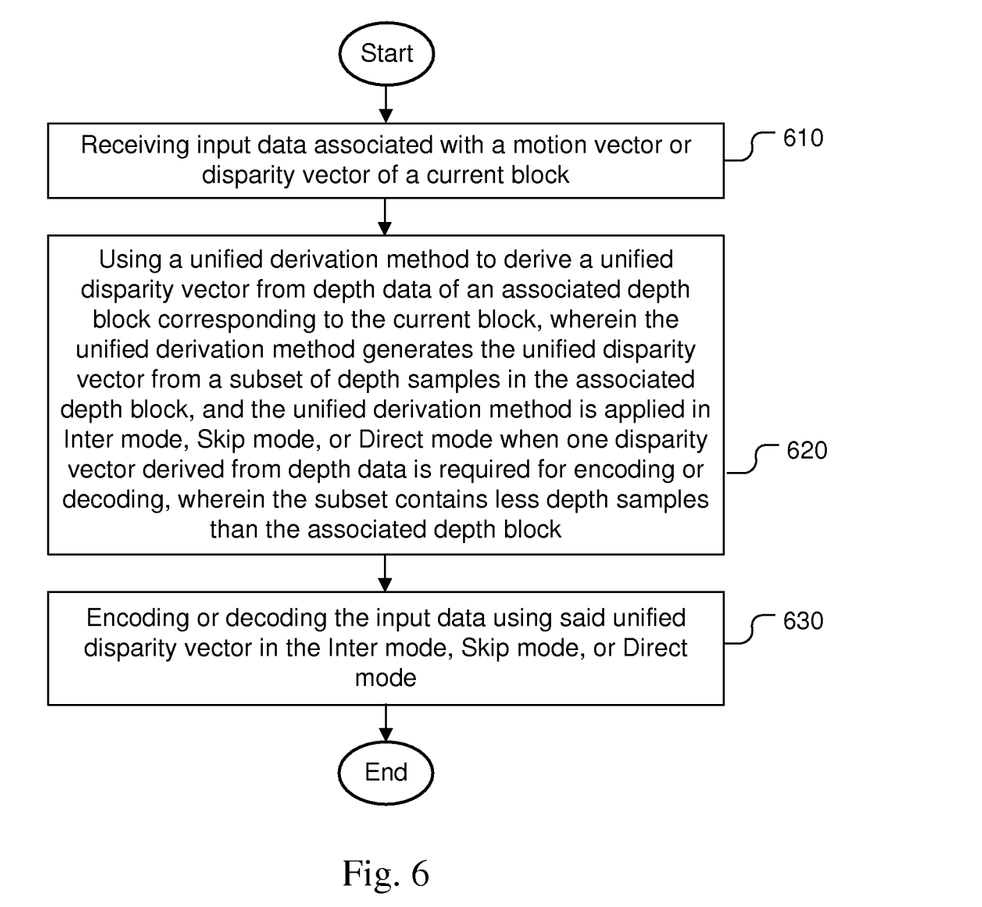
FIG. 6 illustrates an exemplary flowchart for a three-dimensional coding system incorporating a unified disparity vector for Inter mode and Skip/Direct mode according to an embodiment of the present invention.

FIG. 6 illustrates an exemplary flowchart of a three-dimensional encoding or decoding system incorporating a unified derivation method for Inter mode and Skip/Direct mode according to an embodiment of the present invention. The system receives input data associated with the motion vector or disparity vector of the current block as shown in step 610. For encoding, the input data corresponds to the motion vector or disparity vector associated with the current block to be predictively coded. For decoding, the first data corresponds to residual data (i.e., predicted difference) of the motion vector or disparity vector. The input data may be retrieved from storage such as a computer memory, buffer (RAM or DRAM) or other media. The input data may also be received from a processor such as a controller, a central processing unit, a digital signal processor or electronic circuits that produce the first data. A unified derivation method is used to derive a unified disparity vector from depth data of an associated depth block corresponding to the current block in step 620, wherein the unified derivation method generates the unified disparity vector from a subset of depth samples in the associated depth block, and the unified derivation method is applied in Inter mode, Skip mode, or Direct mode when one disparity vector derived from depth data is required for encoding or decoding, wherein the subset contains less depth samples than the associated depth block. Encoding or decoding is then applied to the input data using the disparity vector predictors or motion vector predictors if Inter mode or a spatial candidate of Skip mode or Direct mode is selected for the current block as shown in step 630.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be a circuit integrated into a video compression chip or program code integrated into video compression software to perform the processing described herein. An embodiment of the present invention may also be a program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method executed in a three-dimensional video system, the method comprising:
   receiving input data associated with a motion vector or disparity vector of a current block;
   receiving depth values of depth samples in a depth block corresponding to the current block:
   using a unified derivation method to derive a unified disparity vector from the depth block corresponding to the current block,
   wherein the unified derivation method generates the unified disparity vector from a subset of the depth samples in the depth block, and
   wherein the unified disparity vector is generated from at least one of:
      four corner samples of the depth block:
      a maximum depth value of said four corner samples of the depth block:
   or one of:
      a maximum value,
      an average value,
      a median value,
      a most frequent occurrence, and
      a linear combination of depth values of a depth sample subset of the depth block; and
   decoding the input data using said unified disparity vector in Inter mode, Skip mode, or Direct mode, by:
      using said unified disparity vector to derive an inter-view motion vector or disparity candidate for the current block coded in the Skip mode or the Direct mode,
      where no residual signal and no motion information is transmitted in the Skip mode and no motion information is transmitted in the Direct mode;
      and using said unified disparity vector as a motion vector predictor in the Inter mode.

2. The method of claim 1, further comprising:
   determining one or more disparity vector predictors or one or more motion vector predictors based on a neighboring block set of the current block using the unified disparity vector,
   wherein one disparity vector predictor associated with a first block in the neighboring block set is generated from the unified disparity vector if the first block in the neighboring block set does not have any disparity vector,
   wherein one motion vector predictor associated with a second block in the neighboring block set is generated from a corresponding block located by the unified disparity vector if the second block in the neighboring block set does not have any motion vector.

3. The method of claim 2, wherein said one or more motion vector predictor or said one or more disparity vector predictor are determined from the neighboring block set of the current block according to a search order.

4. The method of claim 1, wherein the unified disparity vector is used for locating a corresponding block in an inter-view picture for disparity compensated prediction (DCP), direction-separated motion vector prediction, inter-view motion prediction, or inter vie residual prediction.

5. The method of claim 1, wherein a flag is used to indicate whether the unified derivation method is shared by the Inter mode, the Skip mode and the Direct mode.

6. The method of claim 1, further comprising:
   determining one or more disparity vector predictors based on a neighboring block set of the current block,
   wherein one disparity vector predictor associated with one block in the neighboring block set is generated from the unified disparity vector if said one block in the neighboring block set does not have any disparity vector; and
   determining a motion vector candidate generated from a corresponding block located by one disparity vector derived from said one or more disparity vector predictors.

7. An apparatus comprising at least one circuit for:
   receiving input data associated with a motion vector or disparity vector of a current block;
   receiving depth values of depth samples in a depth block corresponding to the current block;

using a unified derivation means to derive a unified disparity vector from the depth block corresponding to the current block,
wherein the unified derivation means generates the unified disparity vector from a subset of the depth samples in the depth block, and
wherein the unified disparity vector is generated from at least one of:
four corner samples of the depth block;
a maximum depth value of said four corner samples of the depth block; or one of: a maximum value, an average value, a median value, a most frequent occurrence, and
a linear combination of depth values of a depth sample subset of the depth block; and
decoding the input data using said unified disparity vector in the inter mode, Skip mode, or Direct mode, by:
using said unified disparity vector to derive an inter-view motion vector or disparity candidate for the current block coded in the Skip mode or the Direct mode,
where no residual signal and no motion information is transmitted in the Skip mode and no motion information is transmitted in the Direct mode;
and using said unified disparity vector as a motion vector predictor in the Inter mode.

8. A method executed in a three-dimensional video system, the method comprising:

receiving input data associated with a motion vector or disparity vector of a current block;
receiving depth values of depth samples in a depth block corresponding to the current block;
using a unified derivation method to derive a unified disparity vector from the depth block corresponding to the current block,
wherein the unified derivation method generates the unified disparity vector from a subset of the depth samples in the depth block, and
wherein the unified disparity vector is generated from at least one of: four corner samples of the depth block;
a maximum depth value of said four corner samples of the depth block; or one of:
a maximum value, an average value, a median value, a most frequent occurrence, and
a linear combination of depth values of a depth sample subset of the depth block; and
encoding the input data using said unified disparity vector in Inter mode, Skip mode, or Direct mode, by:
using said unified disparity vector to derive an inter-view motion vector or disparity candidate for the current block coded in the Skip mode or the Direct mode,
where no residual signal and no motion information is transmitted in the Skip mode and no motion information is transmitted in the Direct mode;
and using said unified disparity vector as a motion vector predictor in the Inter mode.

\* \* \* \* \*